Oct. 15, 1957  A. BECHLER  2,809,420
BAR GUIDING AND FEEDING DEVICE FOR AUTOMATIC LATHES
Filed Sept. 4, 1956  2 Sheets-Sheet 1
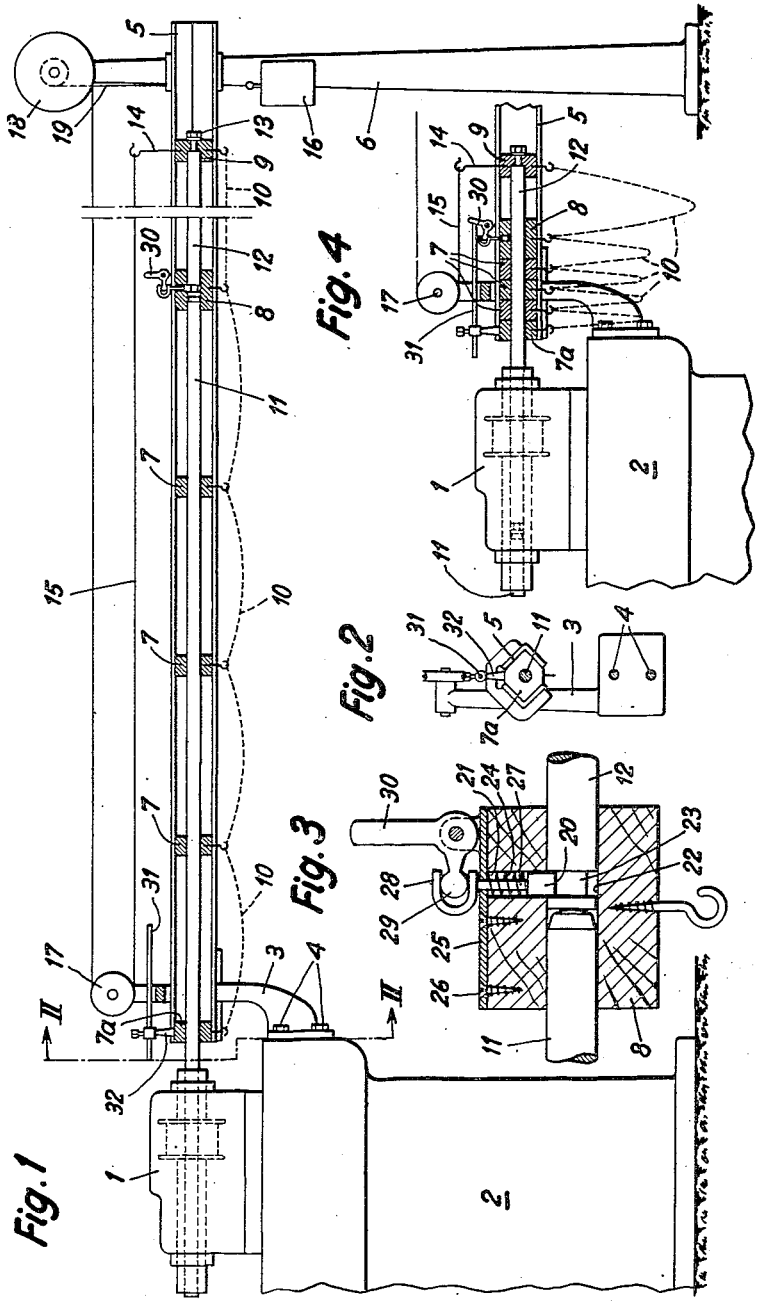

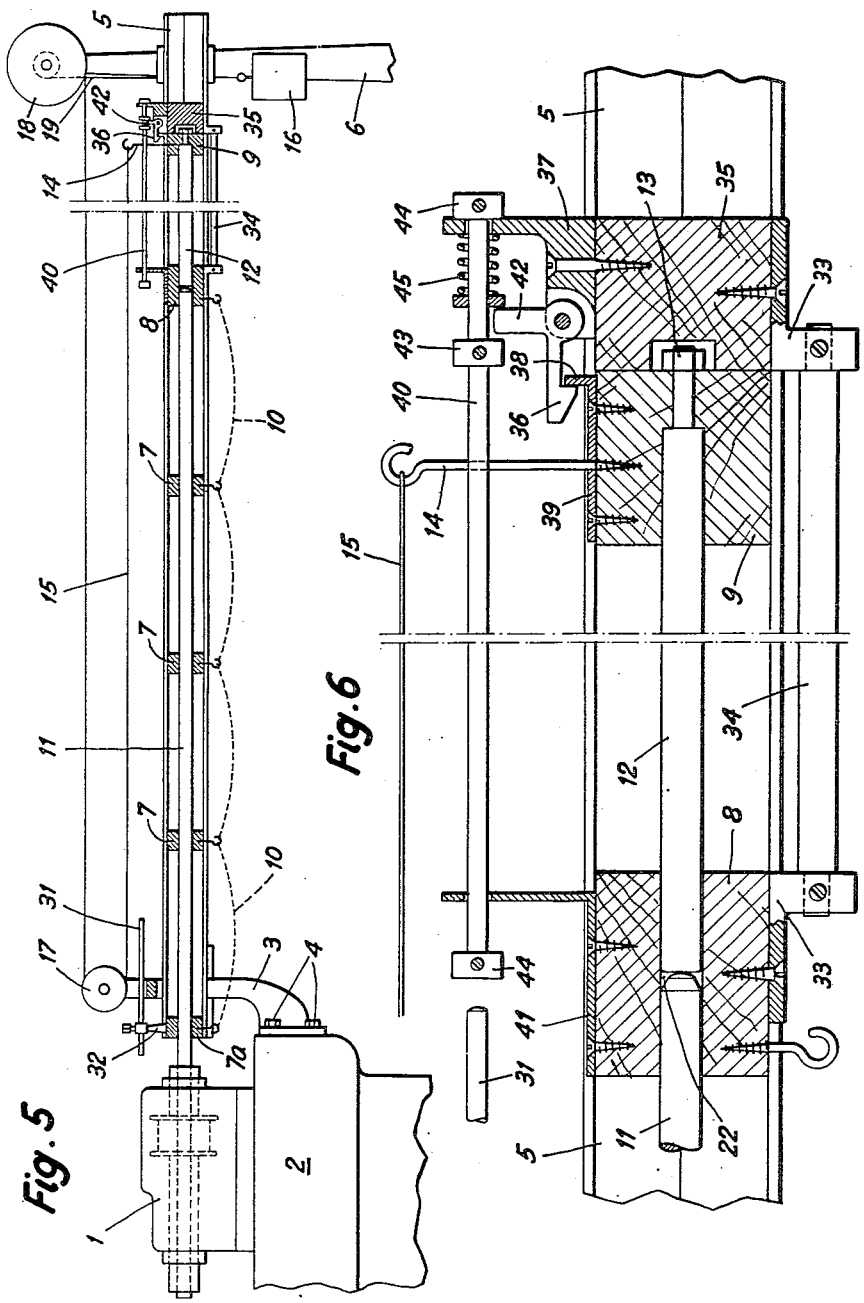

United States Patent Office 2,809,420
Patented Oct. 15, 1957

2,809,420

BAR GUIDING AND FEEDING DEVICE FOR AUTOMATIC LATHES

André Bechler, Moutier, Switzerland

Application September 4, 1956, Serial No. 607,924

Claims priority, application Switzerland September 3, 1955

6 Claims. (Cl. 29—93)

The present invention relates to a bar guiding and feeding device for automatic latches, of the kind comprising a plurality of bar journals and a bar-pusher which are mounted on a guide to slide in the bar-feeding direction, and a weight which acts on said pusher by means of some convenient transmission mechanism.

Devices of this type are well known in the art. The bore of each bar journal has a diameter which is only slightly greater than that of the bar to be fed, the purpose being to reduce to a minimum the vibrations of the rotating bar. This is the reason for which such bar journals are generally not provided with a longitudinal slit which would allow for the passage of a lateral wing of the pusher. Thus it is not possible with such devices to feed the bar until its rear end is almost in the chuck of the lathe; there will thus be a considerable waste of bar material since an end portion of appreciable length, of each bar, will not be fed to the chuck of the lathe.

The main object of the invention is to do away with this serious drawback of the above-mentioned type of bar guiding and feeding devices, which is known to be most advantageous as to reduction of noise.

Another object of the invention is to provide an improved bar guiding and feeding device which is simple in construction and reliable in operation.

Two embodiments of the invention will now be described by way of example with reference to the accompanying drawings, in which:

Fig. 1 is an elevational, partly sectional view of a first embodiment of the device and of a portion of an automatic lathe to which the device is adapted, the movable parts being shown in the position which they occupy at the beginning of the feeding of a bar, Fig. 2 is a transverse sectional view along line II—II of Fig. 1, Fig. 3 is a longitudinal section view of the bar-pushing means at an enlarged scale, Fig. 4 is a view similar to Fig. 1, of only that part of the device which is located close to the lathe, the bar journals and the bar-pushing means being shown in the position which they occupy when the bar is completely fed, Fig. 5 is a view similar to Fig. 1, of a second embodiment and, finally, Fig. 6 is a longitudinal section of the bar-pushing means, the movable parts being shown in the position which they occupy when the feeding operation enters into the terminal stage.

In the drawings, the reference numeral 1 denotes a headstock of an automatic lathe comprising a bed 2 to which a bracket 3 is fixed by means of screws 4. A pair of parallel angle irons 5 are fixed with one of their ends to the brackets 3 and with the other end to a post 6. In cross-section they face each other with their concave sides, a gap being provided between their upper wings and also between their lower wings. Several simple bar journals 7, an intermediate journal 8 and a push-sleeve 9 are slidably mounted in the guide formed by the angle irons 5.

A bar journal 7a similar to the bar journals 7, is secured to that end of the guide which is adjacent to the headstock 1, but it might as well be secured to the headstock 1 by means of e. g. a sleeve. The journals 7, 7a, 8 and the push-sleeve 9 are interconnected by light chains 10 determining the maximum extent to which these journals may be spaced from one another; the purpose of these chains is to obtain an even distribution of the journals at the beginning of the feeding operation, since during this operation the bar to be fed, denoted by the reference numeral 11, must be well guided in all said journals to reduce vibrations and noises to a strict minimum. A push-rod 12 having approximately the same diameter as the bar 11 has its rear end fixed to the push-sleeve 9 by means of a nut 13, whilst its fore end is nested in the rear half of the bore of the intermediate journal 8 and is in engagement with the rear end of bar 11, which is guided in the fore half of the just mentioned bore. The push-sleeve 9 has a hook 14 fixed to it. A cable 15 is attached to this hook with one of its ends, runs over a pulley 17 journalled on the bracket 3 and is attached with its other end to a large diameter portion of a drum 18 the small diameter portion of which has attached to it a cable 19 with a weight 16. The latter is thus operatively connected to the push-sleeve 9 to exert on it a force which is transmitted to the bar 11 by the push-rod 12 to cause feeding of the bar each time when the chuck is released in the headstock.

Latching means will be described which during the normal feeding operation or, in other words, during the first and longer period of this operation, prevent the push-rod to slide through the bore of the intermediate journals 8 and to expulse from this bore the rear end of the bar 11; hence it follows that the intermediate journal 8 progresses with the push-means 9, 12 and in so doing gathers together all the slidable bar journals 7 to the fixed bar journal 7a. Shortly before all clearance has disappeared between the journals 7, 7a and 8 an unlatching mechanism which will be described hereafter becomes automatically active in putting the latching means into their inoperative state, to terminate the first stage, and start the second stage, of the operation of the whole device. During said second stage of the operation, the push-rod 12 progresses first through the bore of the intermediate journal 8, then through the bores of the journals 7 and 7a and eventually through a portion of the bore of the headstock spindle; the length of the push-rod 12 is so determined that when eventually the push-sleeve 9 is stopped by the intermediate journal 8, the bar 11 has its rear end located in, or immediately behind, the chuck usually provided on the fore end of the headstock spindle. Of course, the progression occurs in successive steps as is well known to those familiar with automatic lathes.

The above description applies to both embodiments represented on the drawings. These embodiments differ from each other only in the details of the latching means and of the means rendering the same inoperative at the transition from the first stage into the second stage of the operation.

In the first embodiment, which is represented in Figs. 1 to 4, the latching means comprise a piston 20 slidably mounted in a transversal bore 21 of the intermediate journal 8. In its operative position, shown in Figs. 1 and 3, the inner end of this latching piston 20 protrudes into the central bore 22 of the journal 8 and, in so doing, engages a lateral recess of the push rod, such recess being shown to be constituted by a circumferential groove 23 provided at the fore end of the push-rod 12. The latch piston 20 is secured to a rod 27 of smaller diameter; a coil spring 24 surrounds this rod and is interposed in pretensioned state between the piston and a plate 25 secured to the journal 8 by means of screws 26 and provided with a hole traversed by the rod 27. This rod is made integral with a lug 28 engaged by one arm 29 of a bell-crank lever pivoted on bearing lugs of the plate 25. The other arm 30 of this lever is upstanding and so arranged that it will meet an abutment rod 31 when the operation is to pass from its first stage into its second stage. At this moment, as there is nothing to stop the progression of the intermediate journal 8 bodily with the pivot axis of the lever 29, 30, this lever is being rocked dextrorsum (Fig. 3), thereby retracting the piston 20 from the groove 23. The abutment rod 31 extends parallelly to the guide formed by the angle irons 5; it is longitudinally adjustably secured to a small bracket 32 secured to the fixed journal 7a. The lever 29, 30 constitutes in the unlatching means a means for transmitting the action of the abutment rod 31 to the latch piston 20.

In the second embodiment, which is represented in Figs. 5 and 6, the intermediate journal 8 is rigidly connected to a follower-slide 35 by means of irons 33 and of a rod 35, said follower-slide 35 being movable on the guide 5 behind the push-sleeve 9. The latching means comprise a bell-crank lever swingingly mounted on a bracket 37 secured to the follower-slide 35 normally engaging an ear 38 formed on a piece 39 secured to the push-sleeve 9. The unlatching means comprise, besides the same abutment rod 31 as that provided in the first embodiment, a transmission rod 40 mounted on a bracket 41 secured to the intermediate journal 8 and on the bracket 37 to be slidable in its longitudinal direction parallel to the guide 5 and aligned on the abutment rod 31, and furthermore a collar 43 adjustably positioned on the transmission rod 40 the fore and rear ends of which are fitted with stop collars 44. A coil spring 45 normally acts on an upstanding arm 42 of the lever to hold the latch 36 in engagement with the ear 38. However, when the operation of the device is to pass from its first stage into its second stage, the transmission rod 40 meets the abutment rod 31 and hence is stopped. Since the pivot of the lever 36, 42 continues to progress, this lever is rocked dextrorsum (Fig. 6) by the collar 43 and therefore disengages itself from the ear 38, permitting the push sleeve 9 to leave and to progress further with push-rod 12.

What I claim is:

1. A bar guiding and feeding device for automatic lathes, comprising a guide, bar journals slidable on said guide, a bar-feeding weight, a push-sleeve slidable on said guide and operatively connected to said weight, a push-rod having its rear end fixed to said push-sleeve, an intermediate journal slidable on said guide and along said push-rod, latch means by which this intermediate journal is normally bound to constitute a bearing for the fore end of said push-rod and a journal for the rear end of the bar to be fed, and unlatching means automatically acting in rendering said latching means inactive as soon as all said bar journals, including said intermediate journal, are close together, thereby permitting said push-rod to slide through said intermediate journal and through all said bar journals and thereby to continue the bar-feeding until said push-sleeve abuts against said intermediate journal.

2. A bar guiding and feeding device according to claim 1, wherein said unlatching means include a fixed abutment and a transmission means mounted to move bodily with said intermediate journal and said push-sleeve until it is stopped by said fixed abutment to act directly on said latching means to render them inactive.

3. A bar guiding and feeding device according to claim 2, comprising a bar journal fixed to the fore end of said guide and a bracket fixed to this bar journal, said fixed abutment consisting of a rod extending parallelly to said guide and being longitudinally adjustably secured to said bracket.

4. A bar guiding and feeding device according to claim 3, wherein said push-rod has a lateral recess at its fore end and said intermediate journal a transversal bore, said latching means including a piston slidably mounted in this transversal bore and spring means normally holding said piston engaged in said lateral recess, and wherein said transmission means is a bell-crank lever swingingly mounted on said intermediate journal, one arm of this lever being linked to said piston to retract it from the lateral recess as soon as the other arm meets said fixed abutment.

5. A bar guiding and feeding device according to claim 2, comprising a follower-slide slidable on said guide, rigidly connected to said intermediate journal and located behind said push-sleeve which is bound thereto by said latching means during normal operation of the device.

6. A bar guiding and feeding device according to claim 5, wherein a first and a second bracket are fixed to said intermediate journal and said follower slide, respectively, wherein said transmission means include a transmission rod mounted on said first and second bracket to be slidable in its longitudinal direction parallel to said guide and aligned on said fixed abutment, and a collar fixed on this transmission rod, and wherein said latching means include an ear fixed to said push-sleeve and a bell-crank lever swingingly mounted on said follower-slide and having one arm normally engaging said ear and a second arm swung by said collar when said transmission rod meets said fixed abutment.

References Cited in the file of this patent

FOREIGN PATENTS 968,774     France   ---------------- Dec. 5, 1950